United States Patent [19]

Arndt

[11] Patent Number: 5,069,651
[45] Date of Patent: Dec. 3, 1991

[54] METHOD AND APPARATUS FOR REMOVING PARASITES FROM BEES

[76] Inventor: Maurice W. Arndt, 115 - 11th St. SE., Altoona, Iowa 50009

[21] Appl. No.: 555,835

[22] Filed: Jul. 23, 1990

[51] Int. Cl.⁵ ............................................. A01K 51/00
[52] U.S. Cl. ........................................ 449/2; 449/12; 449/14; 449/61
[58] Field of Search .................. 449/2, 12, 13, 14, 50, 449/52, 61; 43/128

[56] References Cited

FOREIGN PATENT DOCUMENTS

| | | | |
|---|---|---|---|
| 3532149 | 3/1987 | Fed. Rep. of Germany | 449/61 |
| 3538814 | 5/1987 | Fed. Rep. of Germany | 449/2 |
| 230752 | 12/1985 | German Democratic Rep. | 449/12 |
| 1404044 | 6/1988 | U.S.S.R. | 449/12 |

OTHER PUBLICATIONS

Wienands, "The Varroa Mite Has Spread Over Most of the World", *American Bee Journal*, May 1988.
Letter to Editor, *American Bee Journal*, Jan., 1989.
Koeniger and Fuchs, "Eleven Years With Varroa-Experiences", Retrospects and Prospects, date unknown, but believed to be prior art.
Posern, "Advice From Austria-You Can Stop Varroa's Victory March in Your Own Hives", *American Bee Journal*, 1988.
Article, *American Bee Journal*, Apr., 1989, p. 261.

*Primary Examiner*—Robert P. Swiatek
*Attorney, Agent, or Firm*—Zarley, McKee, Thomte, Voorhees, & Sease

[57] ABSTRACT

A device for removing parasites from honey bees within a hive comprises a frame adapted to be fitted over the top of the hive in the place of the lid normally kept on the hive. The frame includes a passageway which is connected to a conduit extending down to the bottom opening of the hive. A spout fits over the bottom opening of the hive. A heating element heats the air which is drawn through the apparatus by a fan located therein. The air is circulated from the top of the hive through the apparatus where it is heated and then is forced into the bottom of the hive through the inlet opening. The temperature is raised to a level which will rid the bees of the parasites, but which can be tolerated by the bees.

9 Claims, 1 Drawing Sheet

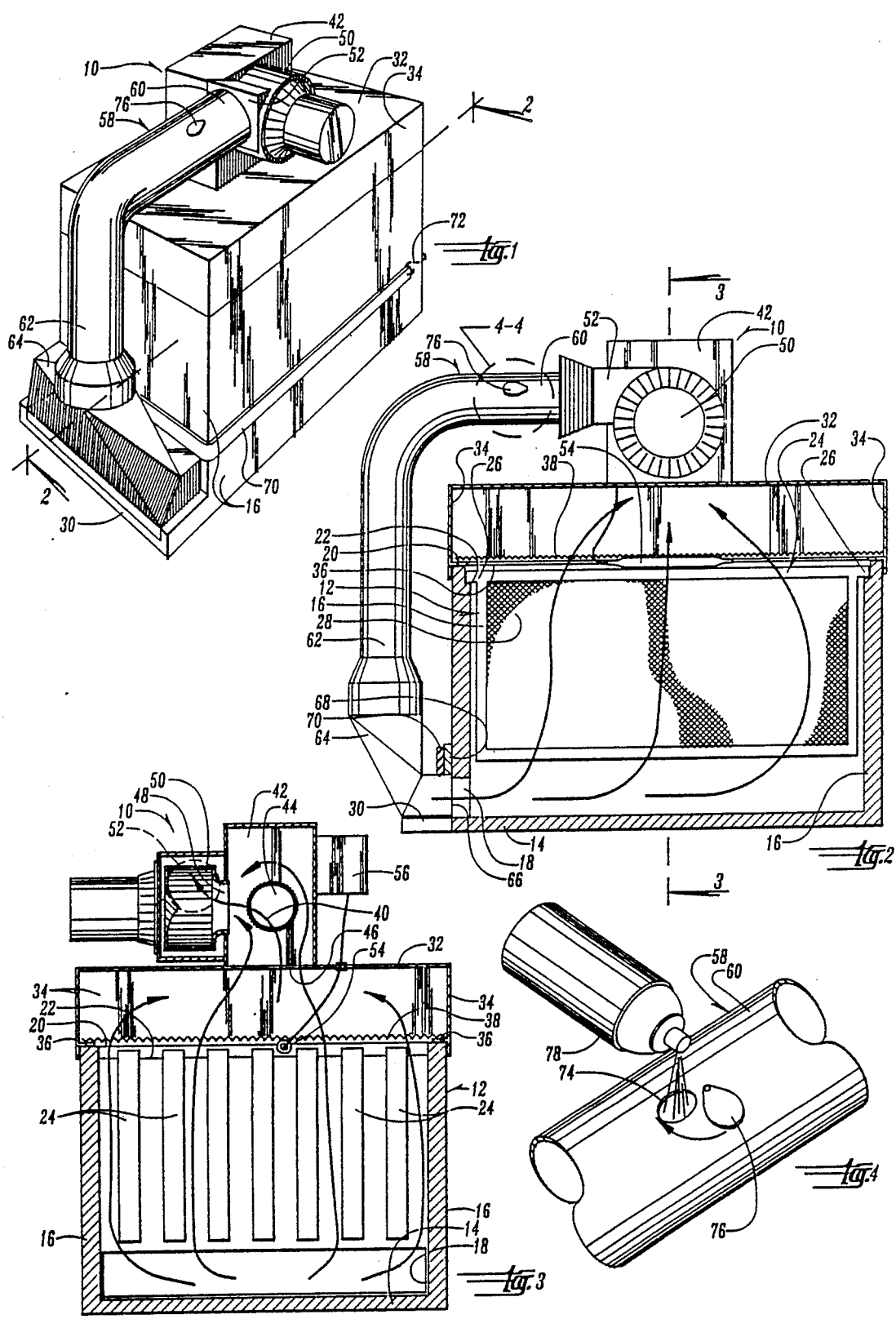

METHOD AND APPARATUS FOR REMOVING PARASITES FROM BEES

BACKGROUND OF THE INVENTION

This invention relates to a method and apparatus for removing parasites from bees.

In recent years, beekeepers have been plagued with a mite called the Varroa mite (*Varroa jacobsoni*) which attaches itself to honey bees and ultimately does severe damage to honey bee colonies being raised by beekeepers.

It has been known that the Varroa mite cannot tolerate warmer temperatures. Statements have been made in prior literature that if the bee colony is exposed to a temperature of 107 to 111 degrees Fahrenheit for 20 or 30 minutes, the result will be that many, if not all, of the mites will drop off the bees and ultimately die. The bees, however, are able to tolerate this temperature.

Therefore, it is desirable to provide a means whereby the bee colony can be heated so as to kill the Varroa mite while at the same time leaving the bees unharmed.

Therefore, a primary object of the present invention is the provision of an improved method and apparatus for removing parasites from bees.

A further object of the present invention is the provision of a device which can be used easily with present beekeeping equipment so as to minimize the time and effort needed to treat the bees.

A further object of the present invention is the provision of a device which can be quickly adapted to a conventional beehive for treating the bees.

A further object of the present invention is the provision of a device which carefully monitors and controls the temperature to which the bees and the Varroa mites are exposed.

A further object of the present invention is the provision of a device which treats the bees with heat and which is also capable of treating the bees with vegetable oil so as to improve the effectiveness of the process in removing the Varroa mites from the colony.

A further object of the present invention is the provision of a method and apparatus which are efficient in operation, economical in use, and effective to remove the Varroa mites from the bee colony.

SUMMARY OF THE INVENTION

The present invention comprises an apparatus which can be fitted over the top of a beehive in the place of the usual beehive lid. The lid of the beehive is removed, and the present apparatus is fitted over the top of the hive. The apparatus includes a passageway therein for drawing air out of the beehive. A fan is connected to the passageway, and a conduit leads from the apparatus down to the inlet opening of the hive adjacent the bottom wall thereof. Within the passageway is a heating element which is used to heat the air. In operation the fan is actuated to draw air out of the hive. The air passes by the heating element and is heated to the desired temperature. It is then forced downwardly and into the hive through the bottom opening of the hive. A thermostat within the apparatus monitors the temperature of the air so that it can be controlled to the proper temperature.

In addition, it has been found that the application of vegetable oil to the air stream greatly increases the efficiency with which the mites are removed. Therefore, the present invention includes an opening wherein vegetable oil can be sprayed directly into the stream of air as it is being forced into the hive. The combination of vegetable oil and heated air results in a very significant improvement in the number of mites which are removed from the colony.

Temperatures may range from about 120 degrees Fahrenheit to about 130 degrees Fahrenheit for a period of about 15 minutes. The preferred temperature range is from 120 degrees Fahrenheit to 125 degrees Fahrenheit. The oil should be sprayed about six to eight times during the 15 minute treatment. Thermostats may be placed at the top of the hive and the bottom of the hive to ensure that the temperature is maintained in the proper ranges.

BRIEF DESCRIPTION OF THE DRAWINGS

FIG. 1 is a perspective view of a conventional hive having the apparatus of the present invention attached thereto.

FIG. 2 is a sectional view taken along line 2—2 of FIG. 1.

FIG. 3 is a sectional view taken along line 3—3 of FIG. 2.

FIG. 4 is an enlarged perspective view of the inlet opening for the vegetable spray to be used with the present invention.

DESCRIPTION OF THE PREFERRED EMBODIMENT

Referring to the drawings, the numeral 10 generally designates the bee treating apparatus of the present invention. Device 10 is mounted on a conventional hive 12. Hive 12 normally has a lid (not shown) which has been removed and replaced by the apparatus 10 in the drawings.

Hive 12 includes a bottom wall 14, side walls 16, and a bottom opening 18 for permitting the bees to enter and leave the hive. The upper margins of walls 16 provide a parametric top edge 20, and two of the opposite side walls 16 include an upwardly presented shoulder 22. Resting on shoulders 22 are a plurality of wax frames 24, each of which have frame lips 26 resting upon the shoulders 22. The frames 24 include wax forms 28 upon which the bees build their honey comb. An entry ledge 30 is provided immediately outside the bottom opening 18.

Apparatus 10 comprises a frame which is made up of a top wall 32 and side walls 34 which are adapted to fit over the walls 16 of the hive. Within side walls 34 is an inwardly projecting parametric lid flange 36 which rests upon the upper edge 20 of the walls 16 A screen 38 extends across the box-like frame of apparatus 10 so as to prevent the bees from entering the apparatus.

Referring to FIG. 3, the arrows 40 designate a passageway through the apparatus 10. The passageway includes a heating chamber 42 having a heating element 44 therein. Chamber 42 has a chamber inlet 46 and a chamber outlet 48. Attached to chamber outlet 48 is a fan 50 having a fan exhaust 52. Attached to screen 38 is a thermometer 54 which is adapted to sense the temperature within the hive 12. Thermometer 34 is connected to a thermostat 56 for setting the temperature within the hive to be in the desired ranges. The thermostat 56 is connected to the heating element 44 and controls heating element 44 to maintain the proper temperature.

Connected to fan exhaust 52 is an elongated flexible conduit 58 having its upper end 60 attached to the fan exhaust 52 and having its lower end 62 connected to a spout 64 which is sized and shaped to fit in sealing relationship over the bottom opening 18 of the hive. Spout 64 includes a spout opening 66 through which air can be forced into the hive through the bottom opening 18. Spout 64 also includes a flange 68 attached thereto. An elastic strap 70 is attached to the flange and includes hooks 72 which hook over the corners of the hive so as to hold the spout 64 in sealed relation over the inlet opening 18:

Within conduit 58 is a spray opening 74 having an opening cover 76 which can be moved from an open to a closed position. As shown in FIG. 4, during the operation of the device, a spray can 78 of vegetable oil can be used to spray vegetable oil into the air stream passing through conduit 58.

In operation, the device is mounted on a hive as shown in FIG. 1. Before mounting, the lid of the hive is removed and the frame of the apparatus 10 is fitted over the top of the hive in the manner shown in the drawings. The spout 64 is fitted over the bottom opening of the hive so as to completely seal the hive. Then fan 50 and heating element 44 are actuated, thereby causing air to be drawn upwardly from the hive into the heating chamber 42 where it is heated and where it is then forced outwardly through the fan exhaust 52 and the conduit 58. The heated air is then introduced through the bottom opening of the hive so as to cause the air within the hive to be heated. The thermometer 54 and the thermostat 56 maintain the temperature within the hive at the desired temperature. The temperature may range from about 120 to about 130 degrees, but the preferred range is from approximately 120 to 125 degrees Fahrenheit. This temperature is sufficient to kill the mites, but it is low enough that it can be tolerated by the bees. Application of this heat to the hive for a period of approximately 15 minutes is sufficient rid the hive of a large portion of the mites.

While heated air only is sufficient to destroy a large number of the mites, an even greater efficiency can be achieved by introducing vegetable oil into the air stream before it is introduced into the hive. This is done by spraying spray can 78 of vegetable oil into the opening 74 so that the vegetable oil is mixed with the heated air prior to the time it is introduced into the hive. The combination of hot air and oil greatly increases the number of mites which are killed during the operation, and it provides a substantially improved result over the use of hot air only. Spraying should be done about six to eight times during the 15 minute treatment period.

The present invention is simple and easy to use. All that is required is the removal of the lid from the existing bee hive, the placement of the apparatus over the top of the hive in the place of the lid, and the fitting of the spout over the bottom opening of the hive. Then actuation of the fan and heating element will cause the hive to be treated. Spray can be added easily with a minimum of effort, and the entire hive can be treated within a matter of 15 minutes. Thus, it can be seen that the device accomplishes at least all of its stated objectives.

I claim:

1. A method for removing parasitic mites from honey bees within a hive, said hive having a bottom opening for permitting said bees to enter and leave said hive, and having a removable lid, said method comprising:

removing said lid from said hive;

placing a treatment apparatus over the top of said hive in the place of said lid, said apparatus having an apparatus frame sized to fit over said hive in the same manner as said lid;

connecting a conduit from said treatment apparatus to said bottom opening of said hive;

using fan means to draw air out of said hive and force said air through said conduit and said apparatus and back into said hive;

heating said air within said apparatus so that said air entering said hive has a temperature high enough to kill said parasites, but low enough to be tolerated by said bees.

2. A method according to claim 1 and further comprising introducing droplets of vegetable oil into said heated air so that said heated air contains said droplets of oil when it enters said hive.

3. A method according to claim 2 wherein said apparatus includes screen means for permitting said fan means to draw air from said hive into said conduit and for preventing said bees from also being drawn into said conduit by said fan means.

4. A method according to claim 2 comprising introducing said vegetable oil into said heated air by spraying said vegetable oil into said conduit while said heated air is passing therethrough.

5. A method for removing parasitic mites from honey bees within a hive having a top opening and a bottom opening, said method comprising: confining said bees within said hive;

placing an elongated conduit having an upper end and a lower end in communication with said hive, said upper end being in communication with said top opening of said hive and said lower end being in communication with said bottom opening of said hive;

heating the air within said conduit to a temperature high enough to cause said parasites to drop off from said bees and low enough to be tolerated by said bees;

introducing droplets of vegetable oil to said heated air in such a manner that said droplets are suspended in said heated air;

circulating said heated air with said vegetable oil droplets suspended therein in a continuous circulation path through said conduit to said hive and back to said conduit again whereby said heated air and said suspended oil droplets will engage said bees having said mites thereon and will cause said mites to drop off from said bees.

6. A method according to claim 5 comprising introducing said droplets by spraying said droplets into said heated air.

7. A method according to claim 5 comprising maintaining said heated air at a temperature of from approximately 120 degrees Fahrenheit to approximately 130 degrees Fahrenheit.

8. Apparatus for removing parasitic mites from bees within a hive, said hive having a top wall, a bottom wall, and side walls enclosing a hive compartment, a bottom opening being provided in said hive adjacent said bottom wall for permitting said bees to enter and exit said hive compartment, said apparatus comprising:

frame means adapted to be attached to said top of said hive, said frame means containing an air passageway having first and second ends, said first end of said passageway being adapted to be in communication with said hive compartment when said frame means is attached to said top of said hive;

conduit means having first and second ends, said first end of said conduit being attached to said second end of said passageway, said second end of said conduit being adjacent said bottom opening of said hive;

spout means attached to said second end of said conduit and having a spout opening sized and shaped to fit in sealing mating relation over said bottom opening of said hive;

fan means in communication with said passageway of said frame means for causing air to be forced through said passageway and said conduit through said spout opening of said spout; and heater means in communication with said passageway for heating said air to a temperature high enough to cause said parasites to drop off said bees within said hive and low enough to be tolerated by said bees.

9. Apparatus according to claim 8 comprising oil feed means within one of said passageway and said conduit for introducing oil droplets into said heated air.

* * * * *